(No Model.)   2 Sheets—Sheet 1.
H. P. GARLAND.
TWO WHEELED VEHICLE.
No. 292,480.  Patented Jan. 29, 1884.
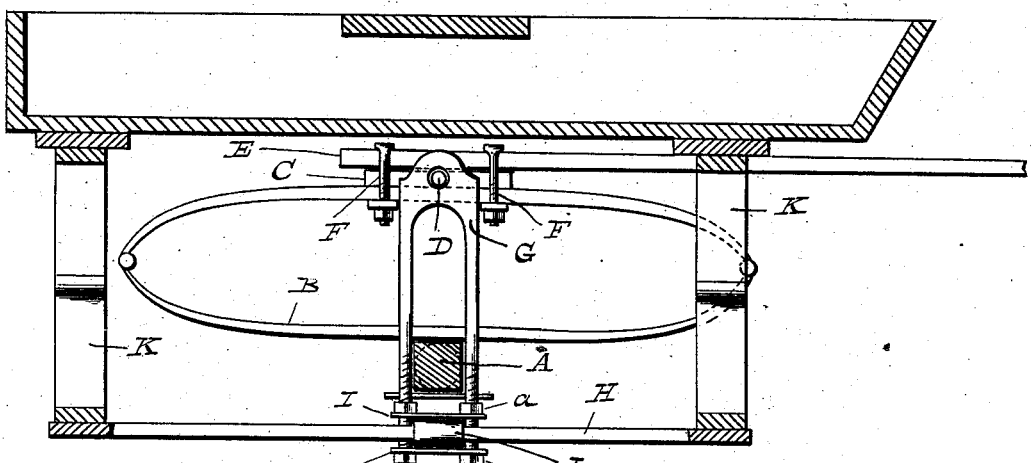
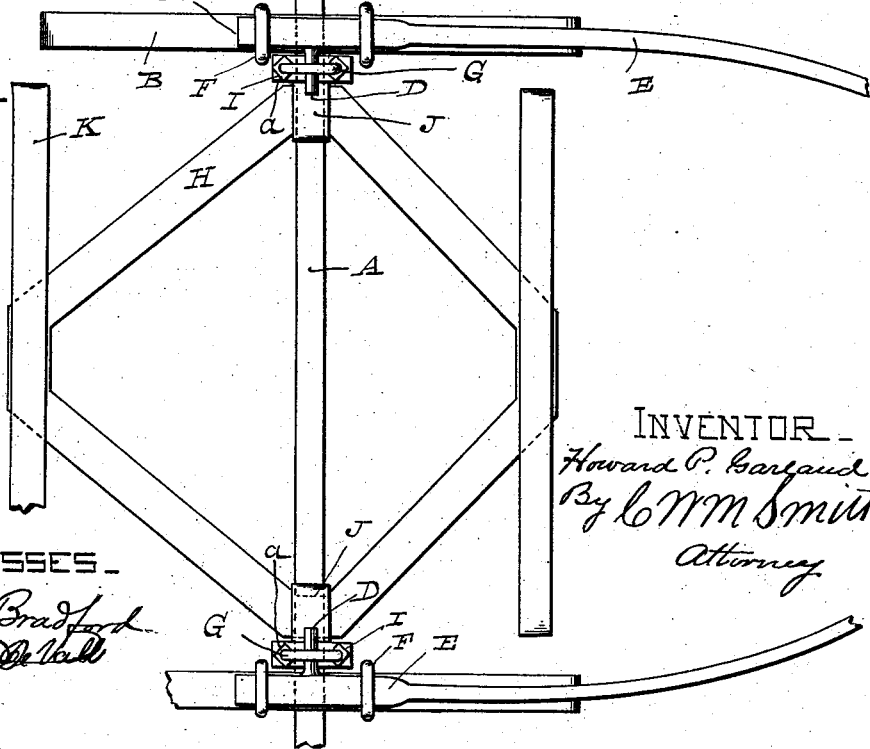
WITNESSES  
Wilmer Bradford  
Herbert DeVall
INVENTOR  
Howard P. Garland  
By C. W. M. Smith  
Attorney (No Model.) 2 Sheets—Sheet 2.
H. P. GARLAND.
TWO WHEELED VEHICLE.
No. 292,480. Patented Jan. 29, 1884.
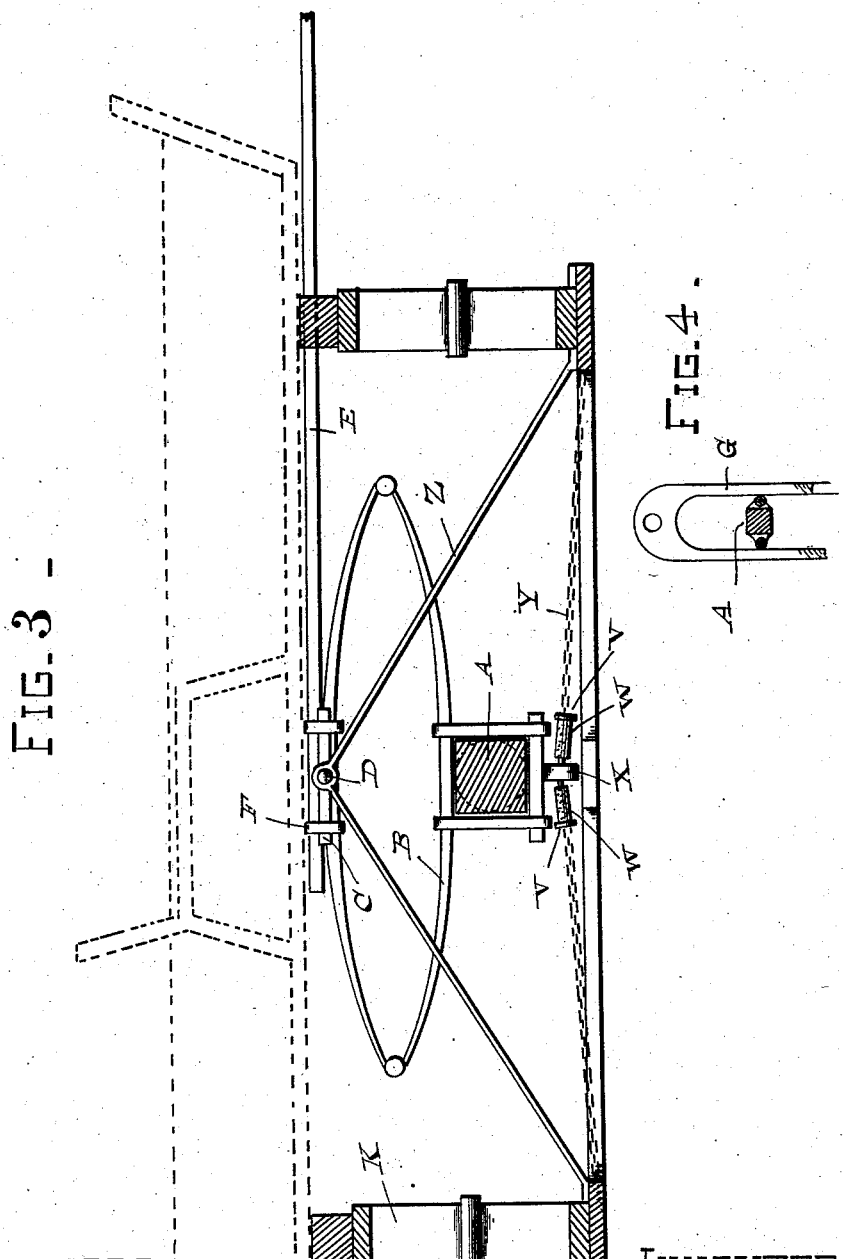
WITNESSES
Wilmer Bradford
Herbert O. Hall
INVENTOR
Howard P. Garland
By C. W. M. Smith
Attorney
N. PETERS. Photo-Lithographer, Washington, D. C.

UNITED STATES PATENT OFFICE.

HOWARD P. GARLAND, OF SAN QUENTIN, CALIFORNIA.

TWO-WHEELED VEHICLE.

SPECIFICATION forming part of Letters Patent No. 292,480, dated January 29, 1884.

Application filed October 22, 1883. (No model.)

*To all whom it may concern:*

Be it known that I, HOWARD P. GARLAND, a citizen of the United States, residing at San Quentin, in the county of Marin and State of California, have invented certain new and useful Improvements in Two-Wheeled Vehicles, of which the following is a specification.

The object of my invention is to provide a means whereby the degree of oscillation imparted to the seat or cart-body when the vehicle is in motion may be reduced to a minimum or obviated altogether. This object I accomplish by means of the mechanism illustrated in the accompanying drawings, in which—

Figure 1 is a central longitudinal sectional view of that portion of a two-wheeled vehicle to which my improvements are applied. Fig. 2 is a plan view of the same, and Fig. 3 is a longitudinal sectional view, illustrating a modification. Fig. 4 is a detail view.

Similar letters of reference are used to indicate like parts throughout the several views.

A is the axle of a two-wheeled vehicle, to the outer ends of which I clip in the usual manner the elliptical side springs, B B. These springs rest upon the upper face of the axle, and upon the upper face of the upper half of each spring I place the blocks C C, each of which has an inwardly-projecting lug or pintle, D D. Over this last-named plate I place the inner ends of the shafts E E, and then clip the shafts, pintle-plate, and spring firmly together by the clips F F.

Upon the pintles D D, I hang the king-clips G G, the forked ends of which extend downward and embrace the axle A, as clearly seen in Fig. 1.

Beneath the axle I hang the square or diamond shaped frame H, held or supported in position by the king-clips, the arms or rods of which are provided with suitable set-nuts, *a*, and pass through washer-plates I I, resting against or above and below clips J J, which are slipped over the right and left hand or wheel sides or edges of the diamond-shaped frame H.

To the front and rear sides or edges of the frame H, I attach the end or bed springs, K K, which extend at right angles to the side springs, or parallel to the axle A, and upon these end springs I place the "piano-box" or bed of the vehicle, which is to be of a less width than the distance between the side springs.

From the foregoing it will be seen that I am enabled to provide a two-wheeled vehicle of light and durable construction, and one in which the size and points of attachment of the various parts can be so adjusted as to bring the center of gravity directly over or in vertical alignment with the axle of the vehicle, and also that the jolting, jarring, or backlash so common to this class of vehicles is avoided, as there is no direct connection between the shafts and axle and the seat or bed of the vehicle, the bed being in reality connected to a swinging frame hung beneath the axle, and held up by connections with the side springs to which the shafts are attached. In the modification shown in Fig. 3 the general construction and the position of the various springs are the same as that already described, the difference being in the manner of hanging the frame H to the side springs, which is done by means of the A-shaped rod Z, pivoted at its apex to the pintle D, and having the lower ends of its legs bolted to the said frame H; and it should here be remarked that there are two of these rods, one upon each side of the vehicle. A stay-chain, Y, is attached to the center of the frame H, and, extending from front to rear, passes through a lug, X, attached to the center of the under side of the axle.

Rubber buffers W W are placed upon the central portion of the stay-chain Y, upon either side of the lug X, and are confined in place by the washer-plates V V, and by this means the forward and backward movement of the frame H is controlled.

Having thus described my invention, what I claim, and desire to secure by Letters Patent, is—

In a two-wheeled vehicle, the side springs, B B, carrying the pintles D D, and to which the shafts are connected, in combination with the king-clips G G, supporting the swinging frame H, to which are connected the end or bed-supporting springs, K K, substantially as shown and set forth.

In testimony that I claim the foregoing I have hereunto set my hand and seal.

HOWARD P. GARLAND. [L. S.]

Witnesses:
 WILMER BRADFORD,
 CHAS. E. KELLY.